United States Patent

[11] 3,598,231

[72] Inventor Carl G. Matson
 401 E. Central Blvd., Kewanee, Ill. 61443
[21] Appl. No. 9,823
[22] Filed Feb. 9, 1970
[45] Patented Aug. 10, 1971

[54] CONVEYOR CLEANER WITH INDIVIDUALLY MOUNTED BLADES
 12 Claims, 10 Drawing Figs.
[52] U.S. Cl. ............................................. 198/230
[51] Int. Cl. ........................................... B65g 45/00
[50] Field of Search .................................. 198/230, 229

[56] References Cited
UNITED STATES PATENTS
3,342,312 9/1967 Reiter ........................ 198/230

Primary Examiner—Richard E. Aegerter
Attorney—Harold M. Knoth

ABSTRACT: A conveyor cleaner for scraping a conveyor belt, constructed so that each scraper blade is individually mounted and includes a floating connection to a support so that the blades may individually accommodate themselves to differing configurations of the belt. Preferably, each blade is mounted on an elongated, steel, rodlike arm having its blade-remote end formed as a coil spring encircling the support and provided with a free end adjustably connected to the support for varying the arm bias toward the conveyor.

PATENTED AUG 10 1971 3,598,231

INVENTOR.
C. G. MATSON

INVENTOR.
C. G. MATSON 3,598,231

CONVEYOR CLEANER WITH INDIVIDUALLY MOUNTED BLADES

BACKGROUND OF THE INVENTION

Conveyor scrapers are well known as expedients to remove accumulated material from the endless belts of conveyors so as to avoid excessive buildup of such accumulations; e.g. U.S. Pat. Nos. 1,975,591 and 3,342,312. The prior art operates on the theory of a support transverse to the length of the conveyor and fixedly positioned or torsionally loaded about its axis and carrying a plurality of rodlike arms to which are respectively affixed an equal number of scraper blades. Reliance is had upon the torsional loading of the support, either during operation or by a set-torque, to keep the blades in scraping engagement with the belt. Another characteristic of the prior art is that the blades are angled rather sharply to the length of the belt and arranged in echelon fashion so as to guide the scraped material off to one side of the belt. This, in combination with the affixation of all arms to the same support, presents the disadvantage of poor blade-to-belt contact, especially in the area of the head or discharge drum or pulley, requiring long periods of break-in.

Another disadvantage of prior art devices is that they prevented easy adjustment of the blades, particularly in those cases in which the blade mounting is most advantageously arranged in close proximity to the head or discharge pulley. This characteristic flows from the fact that the material discharged from the head end of the belt follows a path or "trajectory" in an arc somewhat greater than the arc of the pulley, leaving therefore an ideal space in which to mount the cleaner, but the prior art constructions could not adapt to the head pulley, which often has a distinct crown.

SUMMARY OF THE INVENTION

The construction according to the present invention, in the main, overcomes the foregoing and other disadvantages. The individual mounting and adjustability of each arm enables each blade to adapt itself to the belt contour or configuration, particularly in "troughing" situations. This construction enables the mounting of the cleaner closely proximate to the head or discharge pulley, where adjustments are most easily made and where mountings are more readily accomplished because of the availability of mounting structure, plus the removability of sections of the conveyor in the hopper or discharge area. The invention also features the use of relatively soft steel of low-carbon content, which affords sufficient resiliency but enables easier and more economical manufacture, eliminates breakage and other results from molecular excitation caused by high-frequency vibration of high-carbon steel.

DESCRIPTION OF A PREFERRED EMBODIMENT

Figure 1:
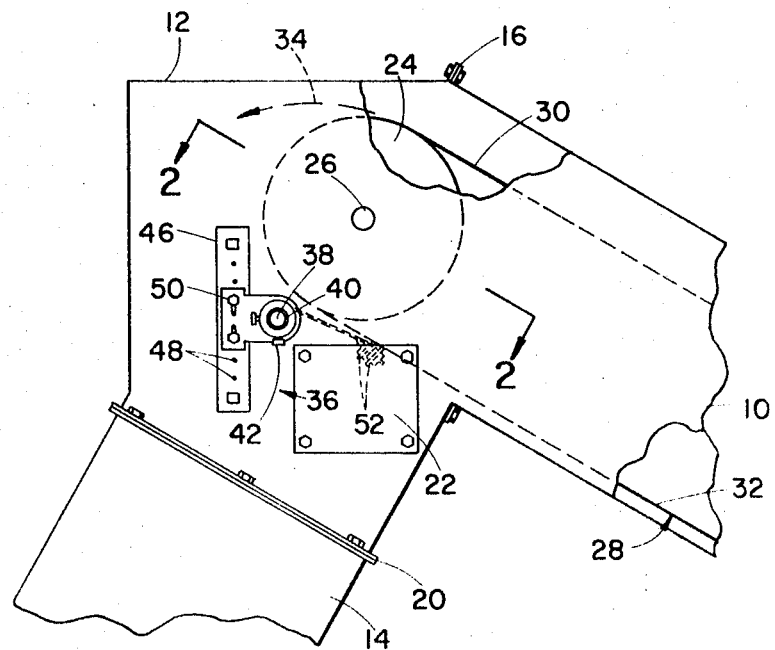
FIG. 1 is a fragmentary elevation, with portions broken away, of the discharge end of a representative conveyor construction embodying one form of the invention.

The "background" structure illustrated in FIG. 1, by way of example, is typical of conveyor constructions, wherein the numeral 10 designates the uphill part of the conveyor which leads to a head or discharge end 12 and the letter in turn leads to a discharge chute or tube 14. These parts may be separably connected by means of flanges and fasteners at 16 and 20 and the part 12 may additionally have a removable access door 22. The part 12 houses the upper or head drum or pulley 24, rotatable on a cross-shaft 26 as is usual. An endless belt 28 is trained about the drum and provides delivery and return runs 30 and 32 respectively.

As suggested by the dotted arrow 34, the material discharged at the head pulley 26 "trajects" in the arc substantially greater than any arcuate portion of the circumference of the pulley, and this provides an ideal spot for the mounting of a conveyor cleaner, designated as a whole at 36. In the example shown, the cleaner includes an elongated support 38, preferably cylindrically tubular, disposed with its length transverse to and in the vicinity of the drum 24 at the return run side 32 of the belt 28. Each end of the support 38 is carried in a circular collar 40 that is rigid with a bracket 42, and each collar has locking means, here in the form of a pair of setscrews 44, for fixedly locating the angular position of the support about its lengthwise axis. The walls of the conveyor head part 12 are suitably apertured (not shown, because conventional) for accommodating the cross-positioning of the support 38.

Externally, the head part wall at each side is reenforced by a vertical bar 46 in which a plurality of vertical apertures 48 is provided to enable adjustable vertical mounting of the brackets 42 by means of bolts and nuts 50. Thus, since the structure 40—42—46 is a rigid part of the conveyor outer part and the support is rockable in the collars 40, the position of the support angularly relative to the collars 40 may be preset and locked by the setscrews 44, and this initially determines the basic adjustment or disposition of a plurality of belt scraper blades 52, each of which is carried by its own individual support-engaging means or arm 54.

Figure 8:
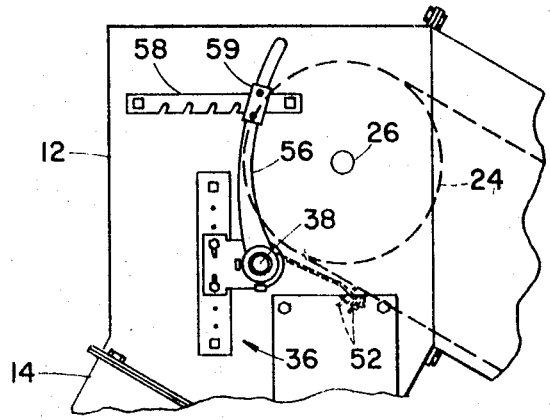
FIG. 8 is a fragmentary view similar to FIG. 1 and showing a modified form of means for applying torsion to the blade support.

In the modified form shown in FIG. 8, the setscrews 44 may be omitted and the support 38 may instead be equipped with a rigid outer arm 56, the upper end of which cooperates with a notched bar 58, which provides adjusting means for varying the external initial location of the angular position of the support 38. The lever has a releaseable latch 59 that cooperates with the bar 58. Additionally, it is known to attach springs, weights, hydraulic devices etc. to an arm such as that shown at 56 for achieving external adjustment. See, for example, applicant's copending application Ser. No. 695,049. These are merely exemplary of what can be accomplished at the head end of the conveyor if the cleaner has the proper characteristics.

According to one form of the invention (e.g., FIGS. 1—9), each arm 54 includes an elongated portion 60 which lies generally along the length of the conveyor run 32. The forward or downhill end of this portion 60 is fitted with a sleeve 61 having a threaded end to receive a nut 62. This affixes the blade 52 to its arm 54. The opposite end of the arm 54 includes support-engaging means whereby each arm is connected to the support 38 in such fashion that each arm is individually rockable about the general axis of the support, relative to the support and relative to the other arms. In a preferred embodiment shown, each arm 54 is of rodlike steel and includes an integral part formed as a helical or spiral coil 64 wrapped loosely around or encircling the support 38, it follows that the arms are individually mounted on the support.

The mounting of each arm on the support affords biased adjustment as well as a limited one-way lost-motion characteristic. This will be best seen in FIGS. 4 and 5, wherein it is shown that the free end of each coil 64, other than its arm portion 60, has an integral extension 66 bent back upon itself, hairpin fashion, to afford a slot 68 that is generally arcuate as respects the axis of the support 38. Each arm 54 and its component parts is formed of relatively soft, low-carbon steel, such as C-1010 or C-1020, and, therefore, each arm is inherently springlike without incurring the disadvantages of high-carbon steel, which is difficult to thread, to coil etc and which further is subject to molecular excitation because of vibration etc.

Because each coil 64 encircles the support individually, it is seen that each arm 54 is individually mounted on the support and thus may be individually biased and adjusted, besides which a one-way lost-motion connection is available because of the slot 68. To accomplish this, the support has a plurality of L-shaped elements or bolts 70, each of which includes legs 72 and 64. Each leg 72 passes through an appropriate diametral bore in the tube or support 38 and carries a nut 76. The other leg 74 passes through the slot 68 and receives a nut 78 (FIGS. 4 and 5) Because of the slot 68, each arm may be freely rocked counterclockwise or toward the conveyor belt run 32 This provides the one-way lost-motion connection. As each nut 78 is tightened, the bias on the associated arm 54 toward the run 32 is increased. In view of the individual mounting and adjustable characteristics of the blades, the blades may readily accommodate themselves to changing belt or drum configurations as best depicted by a comparison of FIGS. 6 and 7.

Figure 9:
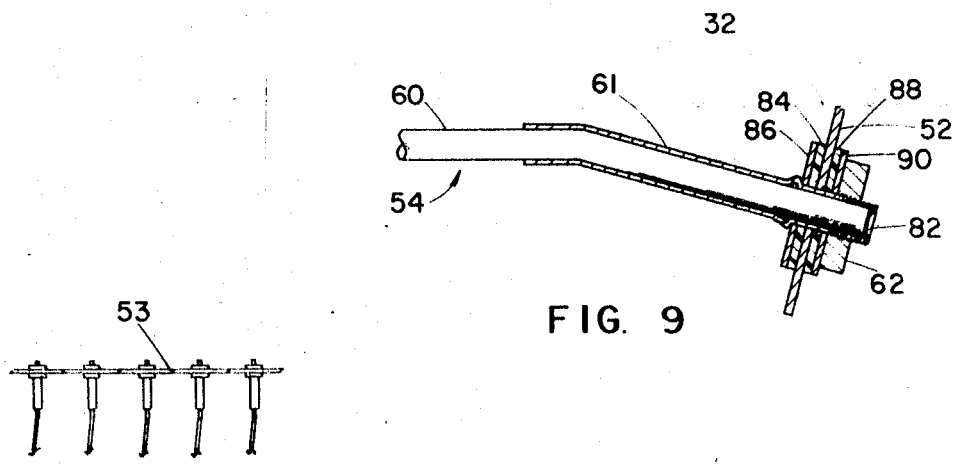
FIG. 9 is an enlarged section of the mounting of a reenforcing sleeve on the arm.
Figure 10:
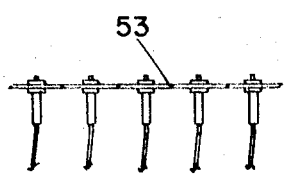
FIG. 10 is a single line blade arrangement of FIG. 2.

As shown in FIG. 9, the sleeve 61 is upset to provide an abutment 80 and its free end is welded at 82 to the arm portion 60 Between one side of the blade 52 are interposed an elastomer washer 84 and a metallic washer 86 and at the other side an elastomer washer 88 and metal washer 90, followed by the nut 62. The elastomer washers provide for a certain amount of adaptation of the blades to the conditions of FIG. 7 and at the same time afford enough friction so that the blades cannot depart from their adapted dispositions without corresponding changes in the belt, it being clear that the belt will "trough" more between its lower and upper pulleys than adjacent to such pulleys, except in those cases in which the pulleys themselves are crowned.

The sleeve 61 is installed on its arm portion 60 while the latter is straight and then both the arm portion and the sleeve are bent together or at the same time to accomplish the bend that gives the negative rake angle of the blade 52 with respect to the lower run of the belt.

The most destructive condition we have found in the field resulted from chatter. Blades have been observed vibrating so violently that they jumped from the belt more than ¼" at a relatively high frequency, 2,000—4,000 times per minute. This chatter produced very early fatigue in any kind of spring arms. As a result of exhaustive testing, it was learned that a negative rake angle of 10—15° eliminated the chatter without sacrificing cleaning ability. The result is the elimination of fatigue-producing vibration. To assure a negative rake angle the spring arms are bent downward 15°. The angle of the arm produces an attack angle of 75°—80°, which is a negative angle of 10°—15°.

The sleeve has the more extensive and difficult operation of threading. This puts the threading operation into the more practical part, the smaller tube which may be chucked in a lathe.

Figure 2:
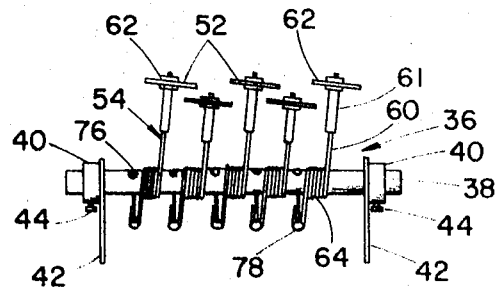
FIG. 2 is a partial section along the line 2—2 of FIG. 1.
Figure 3:
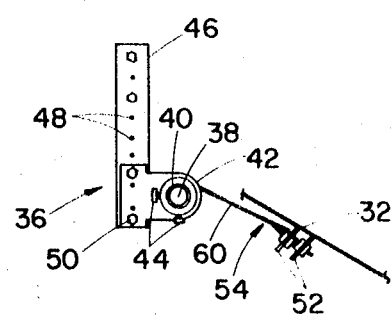
FIG. 3 is a side elevation of the structure shown in FIG. 2.
Figure 4:
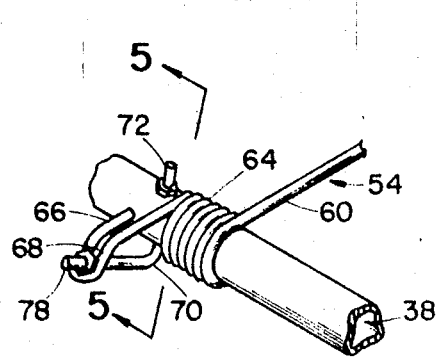
FIG. 4 is an enlarged fragmentary perspective of one form of mounting an individual blade-carrying arm.
Figure 5:
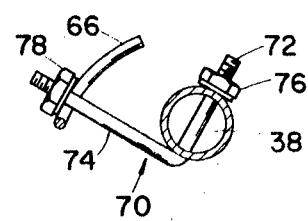
FIG. 5 is a section generally along the line 5—5 of FIG. 4.
Figure 6:
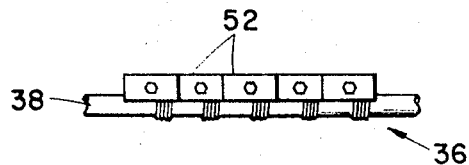
FIG. 6 is a front view of the positions assumed by the blades in a flat condition of the belt.
Figure 7:
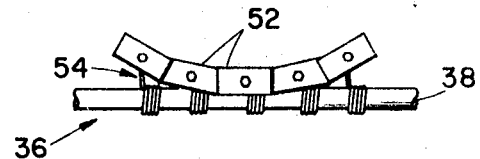
FIG. 7 shows how the blades can adapt to a troughed or crown condition of the belt or drum.

One of the features of the instant construction is that the blades 52 are staggered and also substantially parallel to the axis of the drum 24 as distinguished from the sharp-angle echelon fashion of the prior art, thus allowing the blades to adapt to belt and/or pulley configuration without excessive "wear in" periods. The support and belt assembly can be installed in rather limited quarters and may be easily installed within the head end of the conveyor. The individual arms 54 may be easily adjusted by one hand, as be reaching through the door 22 uncovered. To provide for overlapping cleaning, the blades 52 are staggered, approximately 2 inches apart (FIG. 2). Since the blades 52 are arranged substantially transverse to the belt, the tendency thereof to rotate about the axis of their arms is minimized. The blades 52 can be allowed, therefore, to "float" as respects the belt. Other features will be readily apparent.

each arm portion has, in addition to the bend test shown in FIG. 9 for the negative rake angle, a slight lateral bend so that the blades 52 become aligned end-to-end in traversing arrangement to the conveyor, but the blades having beveled ends 53 that permit a slight overlap from blade to blade. An arrangement of this type works extremely well where the belt must be cleaned of gummy, tenacious material.

I claim:

1. A conveyor cleaner for a conveyor including a rotatable drum and an endless belt trained about the drum and providing delivery and return runs, a support fixedly positionable transversely of and adjacent to one of the runs, a plurality of belt scraper blades disposed transversely of said one run, and a plurality of elongated arms equal in number to the blades and disposed lengthwise of said run, each arm being affixed at one end to a blade and each having support-engaging means at its opposite end, characterized in that each support-engaging means is individual to its arm and is connected to the support so that each arm is rockable relative to the support and relative to each other generally about the length of the support, and a plurality of biasing means is provided, one for each arm and each operative between its arm and the support to bias its respective blade individually toward said run.

2. The invention defined in claim 1, further characterized in that each support-engaging means loosely encircles the support to accomplish the individual rockability of its arm.

3. The invention defined in claim 1, further characterized in that each support-engaging means is an integral extension of its arm in the form of helical coil loosely encircling the support to accomplish the individual rockability of its arm, each coil having a free end portion other than its arm, and each biasing means includes the free end portion of its arm.

4. The invention defined in claim 3, further characterized in that each free end portion is provided with a slot of generally arcuate configuration as respects the longitudinal axis of the support and each biasing means includes an adjustable, support-carried element cooperating with the slot to provide an one-way lost-motion connection between its arm and the support.

5. The invention defined in claim 3, further characterized in that each arm is of resilient, rodlike material and its coil affords a helical spring comprising part of the biasing means.

6. The invention defined in claim 5, further characterized in that the free end portions of each coil is elongated generally arcuately as respects the support axis and in a direction opposite to the arm and is bent back upon itself to provide a generally arcuate slot, and the support carries a plurality of adjusting means, one for and passing through each slot to provide a one-way lost-motion connection between its arm and the support.

7. The invention defined in claim 6, in which each of the last-named adjusting means comprising an L-shaped element having a first leg engaging the support and a second leg cooperating with the slot of its respective coil.

8. The invention defined in claim 5, further characterized in that each arm, its coil and its free end portion are constructed of cold-finished low-carbon steel.

9. The invention defined in claim 1 in which the blades are disposed substantially at right angles to the length of said run.

10. The invention defined in claim 1, in which each blade is disposed at a negative rake angle as respects its scraping relation to the run.

11. The invention defined in claim 1, further characterized in that each blade is affixed to its arm by means of a sleeve tightly telescoped over and affixed to the blade proximate portion of its arm, each blade having an aperture therein through which a terminal portion of the sleeve projects, said sleeve has an enlargement at one side of the blade to provide a blade-supporting abutment, the terminal end of the sleeve is threaded, and a nut is threaded onto said threaded terminal end to confine the blade between the nut and the abutment.

12. The invention defined in claim 11, further characterized in that resilient means is interposed between each side of the blade and its nut and abutment respectively.